(12) United States Patent
Lei et al.

(10) Patent No.: US 11,902,870 B2
(45) Date of Patent: Feb. 13, 2024

(54) NOTIFICATION INFORMATION DISPLAY METHOD AND APPARATUS

(71) Applicant: HUAWEI TECHNOLOGIES CO., LTD., Guangdong (CN)

(72) Inventors: Xiantiao Lei, Beijing (CN); Tao Liu, Beijing (CN); Shulan Feng, Beijing (CN); Lin Shu, Shanghai (CN); Hong Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 168 days.

(21) Appl. No.: 17/599,455

(22) PCT Filed: Feb. 14, 2020

(86) PCT No.: PCT/CN2020/075414
§ 371 (c)(1),
(2) Date: Sep. 28, 2021

(87) PCT Pub. No.: WO2020/168987
PCT Pub. Date: Aug. 27, 2020

(65) Prior Publication Data
US 2022/0174467 A1    Jun. 2, 2022

(30) Foreign Application Priority Data

Feb. 18, 2019   (CN) .......................... 201910123413.1

(51) Int. Cl.
*H04W 4/90*     (2018.01)
*H04W 4/021*    (2018.01)
*H04W 4/06*     (2009.01)

(52) U.S. Cl.
CPC ............. *H04W 4/90* (2018.02); *H04W 4/021* (2013.01); *H04W 4/06* (2013.01)

(58) Field of Classification Search
CPC ......... H04W 4/021; H04W 4/06; H04W 4/90; H04W 12/06; H04W 4/023; H04W 4/029; H04W 4/80; H04W 52/0254
See application file for complete search history.

(56) References Cited

U.S. PATENT DOCUMENTS 9,820,097 B1 *   11/2017   DeLuca ................. H04W 4/023
9,894,478 B1 *   2/2018    DeLuca ................. H04W 4/021
(Continued)

FOREIGN PATENT DOCUMENTS

CN          102238477 A      11/2011
CN          103533498 A       1/2014
(Continued)

OTHER PUBLICATIONS

Qualcomm Incorporated et al, Additional Message Identifier to direct UEs to perform geo-fencing of CMAS messages , 3GPP TSG CT WG1 Meeting #114, C1-190648, Bratislava, Slovakia, Jan. 21-25, 2019, 17 pages.

(Continued)

*Primary Examiner* — Jean A Gelin
(74) *Attorney, Agent, or Firm* — WOMBLE BOND DICKINSON (US) LLP (57) ABSTRACT

This application provides a communication method and a terminal apparatus. The communication method includes: A terminal apparatus receives a trigger message, where the trigger message includes a notification information identifier. When the terminal apparatus does not store notification information corresponding to the notification information identifier, the terminal apparatus ignores the trigger message. In this method, when receiving a useless trigger message, the terminal apparatus does not perform processing, thereby reducing power consumption.

14 Claims, 3 Drawing Sheets

(56) References Cited

U.S. PATENT DOCUMENTS

| | | | |
|---|---|---|---|
| 9,924,315 B1* | 3/2018 | Cornwall | H04W 4/022 |
| 9,980,109 B2* | 5/2018 | Wu | H04W 72/30 |
| 10,127,421 B1 | 11/2018 | Vercalli et al. | |
| 10,257,291 B1* | 4/2019 | Matiash | H04L 67/535 |
| 10,966,050 B1* | 3/2021 | Gu | H04L 63/20 |
| 2003/0162495 A1* | 8/2003 | Yonemoto | H04L 65/764 |
| | | | 370/312 |
| 2007/0143013 A1* | 6/2007 | Breen | G01S 5/0027 |
| | | | 701/32.3 |
| 2007/0207727 A1* | 9/2007 | Song | H04H 60/85 |
| | | | 340/426.2 |
| 2010/0191976 A1* | 7/2010 | Chu | G06F 21/10 |
| | | | 713/168 |
| 2011/0280231 A1* | 11/2011 | Montemurro | H04W 48/08 |
| | | | 370/338 |
| 2012/0322467 A1* | 12/2012 | Obuchi | H04W 52/0216 |
| | | | 455/458 |
| 2013/0155954 A1* | 6/2013 | Wang | H04W 76/27 |
| | | | 370/328 |
| 2014/0220965 A1* | 8/2014 | Yang | H04W 24/02 |
| | | | 455/425 |
| 2014/0351328 A1* | 11/2014 | Woods | H04W 4/021 |
| | | | 709/204 |
| 2015/0031388 A1* | 1/2015 | Chatterjee | G06Q 20/322 |
| | | | 455/456.1 |
| 2015/0237193 A1* | 8/2015 | Zeilingold | H04W 4/021 |
| | | | 455/418 |
| 2017/0048665 A1* | 2/2017 | Yocam | H04W 4/021 |
| 2017/0099579 A1* | 4/2017 | Ryan | H04M 3/5116 |
| 2017/0318093 A1* | 11/2017 | Muhlestein | H04L 67/06 |
| 2018/0109915 A1* | 4/2018 | Shao | H04L 67/52 |
| 2018/0160267 A1* | 6/2018 | Immendorf | H04W 4/021 |
| 2018/0167796 A1* | 6/2018 | Raje | H04W 4/023 |
| 2018/0189162 A1* | 7/2018 | Heirman | G06F 9/30076 |
| 2018/0262903 A1* | 9/2018 | Ryan | H04W 4/90 |
| 2018/0349954 A1* | 12/2018 | Mehta | H04L 67/52 |
| 2019/0066058 A1* | 2/2019 | Spurgeon | G06Q 10/1091 |
| 2019/0090084 A1* | 3/2019 | Jacobs | H04L 69/08 |
| 2019/0163793 A1* | 5/2019 | Buehler | G06F 16/24573 |
| 2019/0261131 A1* | 8/2019 | Keil | H04W 4/022 |
| 2019/0380020 A1* | 12/2019 | Pellegrini | H04M 3/5116 |
| 2020/0105130 A1* | 4/2020 | Chen | H04W 4/02 |
| 2020/0258606 A1* | 8/2020 | Ferentz | G06Q 50/265 |

FOREIGN PATENT DOCUMENTS

| | | |
|---|---|---|
| CN | 104932456 A | 9/2015 |
| CN | 105917680 A | 8/2016 |
| CN | 105956038 A | 9/2016 |
| WO | 2015105793 A1 | 7/2015 |
| WO | 2015199425 A1 | 12/2015 |

OTHER PUBLICATIONS

Qualcomm Incorporated et al, Additional Message Identifier to direct UEs to perform geo-fencing of CMAS messages, 3GPP TSG CT WG1 Meeting #115, C1-191120, Montreal (Canada), Feb. 25-Mar. 1, 2019, 19 pages.

3GPP TS 23.041 V11.0.0:"3rd Generation Partnership Project; Technical Specification Group Core Network and Terminals; Technical realization of Cell Broadcast Service (CBS) (Release 11)",Dec. 2010,total 48 pages.

Qualcomm Incorporated et al, Additional Message Identifier to direct UEs to perform geo-fencing of CMAS messages, 3GPP TSG CT WG1 Meeting #114, C1-190561, Bratislava, Slovakia, Jan. 21-25, 2019, 17 pages.

3GPP TS 23.041 V15.4.0 (Dec. 2018),3rd Generation Partnership Project;Technical Specification Group Core Network and Terminals;Technical realization of Cell Broadcast Service (CBS)(Release 15), total 96 pages.

\* cited by examiner

NOTIFICATION INFORMATION DISPLAY METHOD AND APPARATUS

CROSS-REFERENCE TO RELATED APPLICATIONS

This application is a national stage of International Application No. PCT/CN2020/075414, filed on Feb. 14, 2020, which claims priority to Chinese Patent Application No. 201910123413.1, filed on Feb. 18, 2019. Both of the aforementioned applications are hereby incorporated by reference in their entireties.

TECHNICAL FIELD

This application relates to the field of wireless communication technologies, and in particular, to a notification information display method and an apparatus.

BACKGROUND

Warning area coordinates of an optional information element are added to a warning message of cell broadcast service (CBS) of fourth generation (4G) and fifth generation (5G). User equipment (UE) receives the CBS warning message, which carries the information element. If determining that a location of the UE is outside the warning area coordinate, the UE does not need to display the warning message to a user. Otherwise, the UE displays the warning message to the user. When the waring message is received within a duplicate detection periodicity, if a message identifier (MSG ID) and a serial number in the received warning message are the same as those in previously received warning message, the warning message is considered as duplicated warning message, and the UE needs to ignore the warning message.

A network side sends a geo-fencing trigger message to trigger the UE to determine whether a stored warning message is to be displayed to the user. The trigger message carries a list of a MSG ID and a serial number of a warning message. After receiving the trigger message, the UE determines whether a MSG ID and a serial number of a warning message in a locally stored message list are in the list of the MSG ID and the serial number in the geo-fence trigger message. If the MSG ID and the serial number are in the list, and a geographic location of the UE is inside warning area coordinates of the stored warning message, the warning message is displayed to the user. The network periodically delivers a geo-fencing trigger message and changes a serial number of the trigger message each time the trigger message is delivered, to prevent the trigger message from being discarded as a duplicated warning message through checking.

If the UE does not store a to-be-displayed CBS warning message carrying warning area coordinates, the UE still processes the broadcast geo-fencing trigger message broadcast by the network. Consequently, power consumption of the UE increases.

SUMMARY

This application provides a notification information display method and an apparatus, so that when a useless trigger message is received, no processing is performed, to reduce power consumption.

According to a first aspect, an embodiment of this application provides a notification method. The method is: A terminal apparatus receives a trigger message, where the trigger message includes a notification information identifier. When the terminal apparatus does not store notification information corresponding to the notification information identifier, the terminal apparatus ignores the trigger message.

The terminal apparatus triggers processing on the trigger message only when the terminal apparatus stores the notification information corresponding to the notification information identifier, so that power consumption of the terminal apparatus is reduced.

In an embodiment, when the terminal apparatus stores the notification information corresponding to the notification information identifier, the terminal apparatus notifies, based on at least the trigger message, a user of notification content indicated by the notification information, and deletes the notification information.

In an embodiment, that the terminal apparatus notifies, based on at least the trigger message, a user of notification content indicated by the notification information further includes:
when the terminal apparatus is located in an area indicated by area information, the terminal apparatus notifies the user of the notification content indicated by the notification information, where the notification information includes the area information.

According to a second aspect, an embodiment of this application provides an apparatus, to perform any method provided in the first aspect.

In an embodiment, the communication entity has a function of implementing behavior of a first communication entity in any method in the first aspect. The function may be implemented by hardware, or may be implemented by hardware executing corresponding software. The hardware or the software includes one or more modules corresponding to the foregoing function.

In an embodiment, a structure of the communication entity includes a processor and a transceiver. The processor is configured to support the communication entity in performing a corresponding function in any method in the first aspect, for example, generating, receiving, or processing data and/or information in the foregoing method. The transceiver is configured to support communication between the communication entity and another entity, and send information or an instruction in any method in the first aspect to the another entity or receive information or an instruction in any method in the first aspect from the another entity. The communication entity may further include a memory. The memory is configured to be coupled to the processor, and the memory stores program instructions and data that are necessary for the communication entity.

According to a third aspect, an embodiment of this application provides a computer storage medium, configured to store computer software instructions used by the communication entity provided in the second aspect. The computer software instructions include a program designed for performing the first aspect.

According to a fourth aspect, this application further provides a computer program product including instructions. When the computer program product is run on a computer, the computer is enabled to perform the method according to the first aspect. The computer program product includes computer-executable instructions, and the computer-executable instructions are stored in a computer-readable storage medium. A processor of a communication entity may read the computer-executable instructions from the computer-readable storage medium. The processor executes the computer-executable instructions, so that the communication entity performs an operation performed by the communication entity in the foregoing method provided in the embodiments of this application, or a functional unit corresponding to the operation is deployed in the communication entity.

According to a fifth aspect, this application further provides a chip system. The chip system includes a processor, configured to support a communication entity in implementing a function in the foregoing aspects, for example, generating, receiving, or processing data and/or information in the foregoing methods. In a possible design, the chip system further includes a memory. The memory is configured to store program instructions and data that are necessary for a terminal device. The chip system may include a chip, or may include the chip and another discrete device.

According to a sixth aspect, this application further provides a system, including a network side apparatus and a terminal apparatus. The network side apparatus is configured to send at least one of notification information and a trigger message. The terminal apparatus is used to perform the method according to the first aspect.

BRIEF DESCRIPTION OF DRAWINGS

The following describes in more details embodiments of this application with reference to the accompanying drawings.

DESCRIPTION OF EMBODIMENTS

The following clearly describes technical solutions in embodiments of this application with reference to the accompanying drawings in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: with evolution of the network architecture and emergence of new service scenarios, the technical solutions provided in the embodiments of this application are also applicable to similar technical problems.

A terminal apparatus in the embodiments of this application may be user equipment, an access terminal, a subscriber unit, a subscriber station, a mobile station, a remote station, a remote terminal, a mobile device, a user terminal, a terminal, a wireless communication device, a user agent, a user apparatus, or a chip in the foregoing apparatus. Alternatively, the terminal apparatus may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal apparatus in a 5G network or another future network, a terminal apparatus in a future evolved public land mobile network (PLMN), or a chip in the foregoing apparatus. This is not limited in the embodiments of this application.

A base station in the embodiments this application may be a device configured to communicate with a terminal apparatus. The base station may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in an LTE system, or may be a radio controller in a cloud radio access network (CRAN) scenario, or the like. This is not limited in the embodiments of this application.

A network element in the embodiments of this application may include network devices in a 5G system architecture and/or in a 4G system architecture or another system architecture. The 4G system architecture may include an EPS system architecture. For example, the network element may include an access and mobility management function (AMF) entity, a mobility management entity (MME), a session management function (SMF) entity, an unified data management (UDM) entity, a policy control function (PCF) entity, a policy and charging rules function (PCRF) entity, a packet data network (PDN), a packet data unit (PDU), a PDN control plane gateway (PGW-C), a PDN user plane gateway (PGW-U), a home subscriber server (HSS), an application function (AF) entity, or the like.

The network architecture and the service scenario described in this application are intended to describe the technical solutions in this application more clearly, and do not constitute a limitation on the technical solutions provided in this application. A person of ordinary skill in the art may know that: With the evolution of the network architecture and the emergence of new service scenarios, the technical solutions provided in this application are also applicable to similar technical problems. In this application, nouns "network" and "system" are usually interchangeably used, but a person skilled in the art can understand meanings of the nouns.

To facilitate understanding, the following describes some nouns in this application.

(1) An access network or an access network entity, which is classified into a 5G access network entity and a 4G access network entity, is a device for connecting a terminal device to a wireless network, and includes but is not limited to an evolved NodeB (eNB for short), a radio network controller (RNC for short), a NodeB (NB for short), a base station controller (BSC for short), a base transceiver station (BTS for short), a home base station (for example, a home evolved NodeB, or a home NodeB, HNB for short), a baseband unit (BBU for short), a gNodeB (gNB for short), a transmission reception point (TRP for short), a transmission point (TP for short), a mobile switching center, or the like. In addition, the access network or the access network entity may further include a Wi-Fi access point (AP for short) or the like, and may further include a macro base station, a micro base station, a relay station, an access point, a remote radio unit (RRU for short), or the like in various forms. In different systems, a device having a base station function may have different names. For example, in an LTE network, the device is referred to as an eNB, and in a 3rd generation (3G) network, the device is referred to as a NodeB.

(2) Receiving module: A function of the receiving module can be implemented at a modem (modem) layer of a terminal apparatus. In notification information such as a CBS message, the receiving module mainly receives and parses a broadcast CBS message and checks whether a received CBS message is a duplicated message.

(3) Processing module: A function of the processing module may be implemented at an application (APP) layer of the terminal apparatus, namely, an upper layer of the modem layer. In notification information such as a CBS message, the processing module checks whether the terminal apparatus is located inside a warning area and displays notification content to a user. In addition, the processing module may further include a user interface (UI).

Some common concepts or definitions in the embodiments of this application are explained below. It should be noted that some English abbreviations, such as an LTE system, are used as examples in this specification to describe the embodiments of this application, which may vary with evolution of a network. For specific evolution, refer to descriptions in corresponding standards.

In this application, a 4G network may also be referred to as an EPS network, an access network of the 4G network is referred to as an E-UTRAN, and a core network of the 4G network is referred to as an EPC network. A 5G network may also be referred to as a new radio (NR for short) network, and a 5G system is referred to as 5GS for short. A plurality of nouns of a same meaning in this application are used alternately.

The "data" in this application usually means service data, but may also include content, such as signaling and a message, needing to be transmitted by a system, for example, a reference signal and an uplink control message/a downlink control message.

The term "and/or" in this application describes only an association relationship for describing associated objects and indicates that three relationships may exist. For example, A and/or B may indicate the following three cases: Only A exists, both A and B exist, and only B exists. In addition, the character "/" in this specification usually indicates an "or" relationship between the associated objects.

Figure 1:
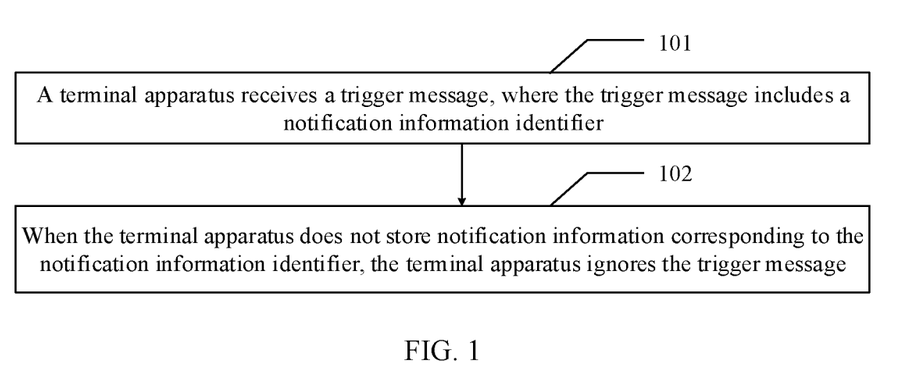
FIG. 1 is a flowchart of a method according to an embodiment of this application.

FIG. 1 shows an embodiment of this application. As shown in FIG. 1, the following operations are included.

Operation S101: A terminal apparatus receives a trigger message, where the trigger message includes a notification information identifier.

The trigger message is sent by a network side apparatus, and the notification information identifier is used to determine notification information corresponding to the notification information identifier.

Operation S102: When the terminal apparatus does not store the notification information corresponding to the notification information identifier, the terminal apparatus ignores the trigger message.

In an embodiment, the terminal apparatus triggers processing on the trigger message only when the terminal apparatus stores the notification information corresponding to the notification information identifier, so that power consumption of the terminal apparatus is reduced.

Figure 2:
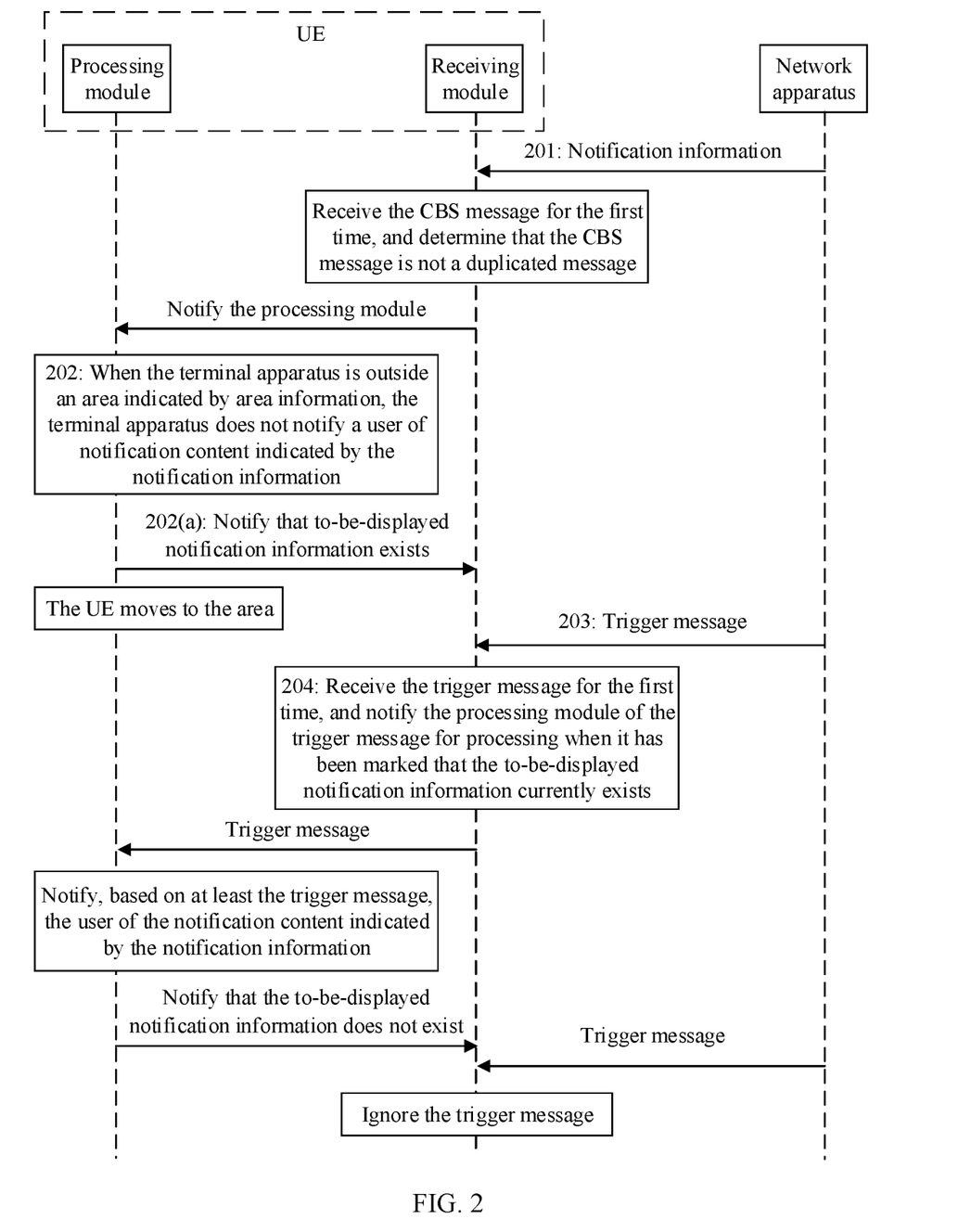
FIG. 2 is a schematic interaction diagram of a communication method according to another embodiment of this application.

FIG. 2 shows an embodiment of this application. As shown in FIG. 2, the following operations are included.

Operation S201: A terminal apparatus receives notification information, where the notification information includes area information.

The terminal apparatus receives the notification information from a network side apparatus, and the network side apparatus sends the message through broadcast, for example, broadcasts the notification information by using a message of system information block type 12 in a 4G network, or broadcasts the notification information by using a message of system information block type 8 in a 5G network. The notification information includes the area information, the area information is used to indicate a geographic area or range, and the area information may be information about warning area coordinates. The notification information may be a cell broadcast service (CBS) warning message. The terminal apparatus may receive the notification information by using a receiving module.

Operation S202: When the terminal apparatus is outside the area indicated by the area information, the terminal apparatus does not notify a user of notification content indicated by the notification information.

After the terminal apparatus receives the notification information, the receiving module determines that the notification information is not duplicated information, and the receiving module notifies a processing module that the notification information is received. The processing module may be used to determine whether a location of the terminal is in the area indicated by the area information. In an embodiment, the terminal apparatus may determine a current geographic location of the terminal apparatus based on latest GPS geographic location information stored in the terminal apparatus, or may determine the current geographic location based on an accessed network. Then, the area is compared with the current geographic location of the terminal apparatus, to determine whether the terminal apparatus is within a range of the area. Alternatively, determining may be performed in another existing determining manner.

When a determining result of the terminal apparatus is that the terminal apparatus is not in the area, the terminal apparatus does not notify the user of the notification content indicated by the notification information, and stores the notification information.

In an embodiment, in operation S202(a), the processing module of the terminal apparatus may mark that a current status is that to-be-displayed notification information exists, the notification information is stored, or the to-be-displayed notification information is stored. The marking may be implemented by notifying the receiving module by the processing module. In addition, because displayed notification information is deleted, that the to-be-displayed notification information exists is equivalent to that the notification information is stored, that is, the to-be-displayed notification information is stored. The processing module may implement the marking by sending a notification to the receiving module, so that the receiving module learns of the current status.

The terminal apparatus marks that the current status is that the to-be-displayed notification information exists, the notification information is stored, or the to-be-displayed notification information is stored. The operation of sending the notification to the receiving module may be performed after the terminal device receives the notification information and determines not to notify the user, or may be performed after the terminal device subsequently receives the first piece of trigger message and determines not to notify the user.

A manner of notifying the user in all embodiments of this application may be to display the notification content by using a display screen of the terminal apparatus, or may be a voice broadcast manner. In addition, vibration, ringing, and the like may be added. If the terminal apparatus is a chip, the terminal apparatus may command a display apparatus of a device controlled by the terminal apparatus to display the notification content. Notification content indicated by first notification information may include welcome content, warning content, another precaution needing to be obtained by the user, and the like.

In addition, the notification content indicated by the notification information may be included in the notification information. Or the notification content may be notification content which is indicated by a signaling and generated by the terminal apparatus according to the signaling, wherein the signaling has been agreed with the terminal apparatus.

Operation S203: The network side apparatus sends a trigger message to the UE, where the trigger message may be a geo-fencing trigger message, and may be periodically sent in a broadcast manner, may not be periodically sent, or may be sent together with the notification information. Each trigger message includes a different serial number, and content of the message carries a list of a message identifier (ID) and a serial number of notification information.

Operation S204: The terminal apparatus receives the trigger message. The receiving module receives the trigger message for the first time, and notifies the processing module of the trigger message for processing when it has been marked in operation S202 that the to-be-displayed notification information currently exists. That the terminal apparatus notifies, based on at least the trigger message, the user of the notification content indicated by the notification information includes: When the terminal apparatus is located in the area indicated by the area information in the notification information, and a message ID and a serial number of the stored notification information are in the list of the message ID and the serial number of the trigger message, the user is notified of content of the notification information, the notification information is deleted, and the receiving module is notified that no to-be-displayed notification message is stored currently. That is, the terminal apparatus may mark that the current status is that the to-be-displayed notification information does not exist, the notification information is not stored, or the to-be-displayed notification information is not stored. The marking may be implemented by notifying the receiving module by the processing module.

If the terminal apparatus is not in the area, the terminal apparatus does not notify the user, and continues storing the notification information. In an embodiment, if operation 202(*a*) is not performed in operation 202, the terminal apparatus may mark that the current status is that the to-be-displayed notification information exists, the notification information is stored, or the to-be-displayed notification information is stored.

Operation S205: When a trigger message sent by the network apparatus is received again, and the to-be-displayed notification information does not exist in the terminal apparatus, that is, a status of the terminal apparatus is that the to-be-displayed notification information does not exist, the notification information is not stored, or the to-be-displayed notification information is not stored, the receiving module ignores the trigger message. The receiving module may not send or report the trigger message to the processing module, or may delete or discard the trigger message, to implement the ignoring, so that the processing module does not need to process the notification information. That the processing module does not need to process the notification information may be that the processing module does not receive an indication that the receiving module receives the notification information, or does not receive the notification information, and does not perform any determining, calculation, or the like on the notification information. The processing module may be in sleep state and does not start processing, thereby reducing power consumption.

If no notification information is displayed to the user in operation 204, the receiving module still performs operation 204 after receiving the trigger message.

When an APP layer does not perform any operation, the processing module is in sleep state. When no notification information is stored, a modem layer receives the trigger message, discards the message, and does not wake up the APP layer, so that power consumption of the APP layer is reduced, and power consumption is finally reduced.

Figure 3:
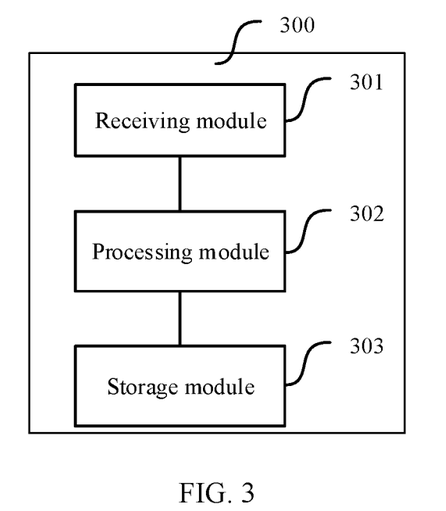
FIG. 3 is a schematic diagram of an apparatus according to this application.

FIG. 3 is a schematic block diagram of a terminal apparatus 300 according to an embodiment of this application. It should be understood that the terminal apparatus 300 can perform the operations performed by the terminal apparatus in the methods in FIG. 1 and FIG. 2. To avoid repetition, details are not described herein again. The terminal apparatus 300 includes a receiving module 301 and a processing module 302, and may further include a storage module 303. The receiving module 301 is configured to perform a related operation performed by the receiving module in the embodiment shown in FIG. 2, the processing module 302 is configured to perform a related operation performed by the processing module in the embodiment shown in FIG. 2, and the storage module 303 may be configured to store notification information.

In an embodiment, the receiving module 301 is configured to receive a trigger message, where the trigger message includes a notification information identifier; and is further configured to ignore the trigger message when the terminal apparatus does not store notification information corresponding to the notification information identifier.

When the terminal apparatus stores the notification information corresponding to the notification information identifier, the processing module 302 is configured to: process the trigger message, delete the notification information, and indicate the receiving unit to ignore the trigger message. In the foregoing embodiments provided in this application, the parameter determining methods provided in the embodiments of this application are described separately from perspectives of each network element and interaction between network elements. It may be understood that, to implement the foregoing functions, the network elements, such as a terminal device (for example, UE) and a network device (for example, a base station), include a corresponding hardware structure and/or software module for performing each function. A person skilled in the art should easily be aware that, in combination with the examples described in the embodiments disclosed in this specification, units and algorithm operations may be implemented by hardware or a combination of hardware and computer software in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 4:
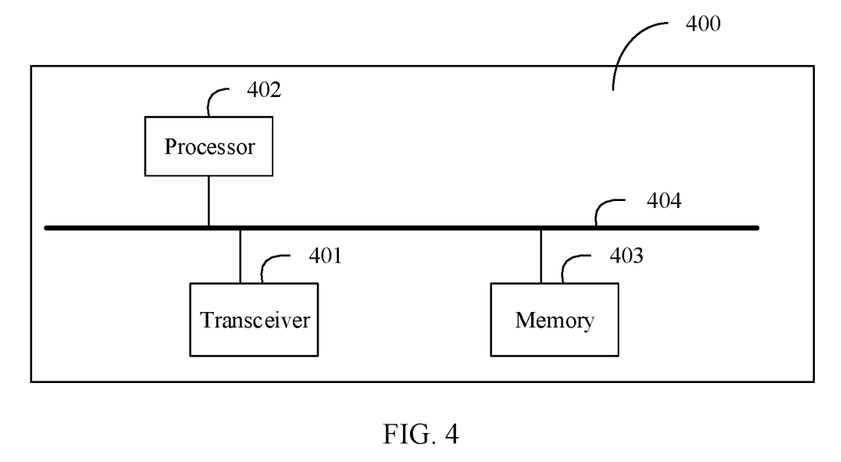
FIG. 4 is a schematic diagram of a communication entity according to this application.

Based on the same concept, an embodiment of this application further provides a terminal apparatus 400. As shown in FIG. 4, the terminal apparatus 400 includes at least a transceiver 401 and a processor 402, may further include a memory 403, and may further include a bus 404.

The processor 402, the memory 403, and the transceiver 401 are all connected by using the bus 404.

The memory 403 is configured to store computer-executable instructions.

The processor 402 is configured to execute the computer-executable instructions stored in the memory 403.

The processor 402 executes the computer-executable instructions stored in the memory 403, to enable the terminal apparatus 400 to perform an operation performed by the terminal apparatus in any one of the foregoing embodiments provided in this application.

The processor 402 may include processors of different types, or may include processors of a same type. The processor 402 may be any one of the following components having a computing processing capability, for example, a central processing unit (CPU for short), an ARM processor (advanced reduced instruction set computing (RISC) machines processor, also referred to as a simplified instruction set processor), a field programmable gate array (FPGA for short), and a dedicated processor. In an optional implementation, the processor 402 may be integrated as a many-core processor.

The memory 403 may be any one or any combination of the following storage media, such as a random access memory (RAM for short), a read-only memory (ROM for short), a non-volatile memory (NVM for short), a solid-state drive (SSD for short), a mechanical hard disk, a magnetic disk, and a disk array.

The bus 404 may include an address bus, a data bus, a control bus, and the like. For ease of representation, the bus is represented by using a thick line in FIG. 4. The bus 1404 may be any one or any combination of the following components used for wired data transmission, for example, an industry standard architecture (ISA for short) bus, a peripheral component interconnect (PCI for short) bus, and an extended industry standard architecture (EISA for short) bus.

An embodiment of this application provides a computer-readable storage medium. The computer-readable storage medium stores computer-executable instructions. A processor of a terminal device executes the computer-executable instructions, so that a communication entity performs an operation performed by a first communication entity in the parameter determining method provided in this application, or a functional unit corresponding to the operation is deployed in the communication entity.

An embodiment of this application provides a computer-readable storage medium. The computer-readable storage medium stores computer-executable instructions. A processor of a communication entity executes the computer-executable instructions, so that the communication entity performs an operation performed by a third communication entity in the parameter determining method provided in this application, or a functional unit corresponding to the operation is deployed in the communication entity.

An embodiment of this application provides a computer program product. The computer program product includes computer-executable instructions, and the computer-executable instructions are stored in a computer-readable storage medium. A processor of a communication entity may read the computer-executable instructions from the computer-readable storage medium. The processor executes the computer-executable instructions, so that a terminal device performs an operation performed by a first communication entity in the foregoing methods provided in the embodiments of this application, or a functional unit corresponding to the operation is deployed in the communication entity.

An embodiment of this application provides a computer program product. The computer program product includes computer-executable instructions, and the computer-executable instructions are stored in a computer-readable storage medium. A processor of a communication entity may read the computer-executable instructions from the computer-readable storage medium. The processor executes the computer-executable instructions, so that the communication entity performs an operation performed by a third communication entity in the foregoing methods provided in the embodiments of this application, or a functional unit corresponding to the operation is deployed in the communication entity.

This application further provides a chip system. The chip system includes a processor, configured to support a communication entity in implementing a function in the foregoing aspects, for example, generating, receiving, or processing data and/or information in the foregoing methods. In a possible design, the chip system further includes a memory. The memory may be configured to store program instructions and data that are necessary for a terminal device. The chip system may include a chip, or may include the chip and another discrete device.

This application further provides a system. The system includes the network apparatus and the terminal apparatus in the embodiments.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD for short)), or the like.

A person skilled in the art may further understand that various illustrative logical blocks (illustrative logical block) and operations (operation) that are listed in this application may be implemented by using electronic hardware, computer software, or a combination thereof. Whether the functions are implemented by using hardware or software depends on particular applications and a design requirement of the entire system. A person skilled in the art may use various methods to implement the functions for each particular application, but it should not be considered that the implementation goes beyond the scope of this application.

Various illustrative logic units and circuits described in this application may implement or operate the functions by using a general-purpose processor, a digital signal processor, an application-specific integrated circuit (ASIC for short), a field-programmable gate array (FPGA for short) or another programmable logic apparatus, a discrete gate or transistor logic, a discrete hardware component, or a design of any combination of the foregoing devices. The general-purpose processor may be a microprocessor. Optionally, the general-purpose processor may alternatively be any conventional processor, a controller, a microcontroller, or a state machine. The processor may alternatively be implemented by a combination of computing apparatuses, such as a digital signal processor and a microprocessor, a plurality of microprocessors, one or more microprocessors in combination with a digital signal processor core, or any other similar configuration.

Operations of the methods or algorithms described in this application may be directly embedded into hardware, a software unit executed by a processor, or a combination thereof. The software unit may be stored in a random access memory (RAM for short), a flash memory, a read-only memory (ROM for short), an erasable programmable read-only register (EPROM for short), a register, a hard disk, a removable disk, a compact disc read-only memory (CD-ROM for short), or any other form of storage medium in the art. For example, a storage medium may be connected to a processor, so that the processor may read information from the storage medium and write information to the storage medium. Optionally, the storage medium may alternatively be integrated into the processor. The processor and the storage medium may be disposed in an ASIC, and the ASIC may be disposed in the terminal device or the network device. Optionally, the processor and the storage medium may alternatively be disposed in different components in the terminal device or the network device.

In one or more examples of designs, the functions described in this application may be implemented by using hardware, software, firmware, or any combination thereof. If the functions are implemented by software, the functions may be stored in a computer-readable medium or transmitted to the computer-readable medium in a form of one or more instructions or code. The computer-readable medium includes a computer storage medium or a communication medium that enables a computer program to move from one place to another. The storage medium may be an available medium that may be accessed by any general-purpose computer or a special computer. For example, such a computer-readable medium may include but is not limited to a RAM, a ROM, an EEPROM, a CD-ROM, another optical disc storage, a disk storage, another magnetic storage apparatus, or any other medium that may be used to carry or store program code, where the program code is in a form of an instruction or a data structure or in a form that can be read by the general-purpose computer or special computer or a general-purpose processor or special processor. In addition, any connection may be appropriately defined as a computer-readable medium. For example, if software is transmitted from a website, a server, or another remote resource by using a coaxial cable, an optical fiber computer, a twisted pair, or a digital subscriber line (DSL), or in a wireless manner such as an infrared manner, a radio manner, or a microwave manner, the software is also included in the defined computer-readable medium. The disk and the disc each include a compact disc, a laser disc, an optical disc, a digital versatile disc (DVD for short), a floppy disk, and a Blu-ray disc. The disc usually copies data by using a magnetic means, and the disk optically copies data by using a laser means. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another. The storage medium may be any available medium accessible to a general-purpose computer or a dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application. According to the foregoing descriptions of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs, but may also be extended to a maximum scope that is consistent with the principles and disclosed new features of this application.

What is claimed is:

1. A communication method, comprising:
   receiving, by a terminal apparatus, a first geo-fencing trigger message, wherein the first geo-fencing trigger message comprising a notification information identifier;
   in response to determining that the terminal apparatus stores notification information corresponding to the notification information identifier, notifying by the terminal apparatus, a user of notification content indicated by the notification information, and deleting, by the terminal apparatus, the notification information,
   receiving, by the terminal apparatus, a second geo-fencing trigger message, wherein the second geo-fencing trigger message comprises the notification information identifier;
   and
   in response to determining that the terminal apparatus does not store the notification information corresponding to the notification information identifier, ignoring, by the terminal apparatus, the second geo-fencing trigger message.

2. The method according to claim 1, wherein the notifying, by the terminal apparatus, the user of notification content indicated by the notification information further comprises:
   in response to determining that the terminal apparatus is located in an area indicated by area information included in the notification information, notifying, by the terminal apparatus, the user of the notification content indicated by the notification information.

3. The method according to claim 2, further comprising:
receiving, by the terminal apparatus, the notification information, wherein the notification information comprises the area information;
in response to determining that the terminal apparatus is located outside the area indicated by the area information, not notifying, by the terminal apparatus, the user of the notification content indicated by the notification information; and
storing, by the terminal apparatus, the notification information.

4. The method according to claim 1, wherein the notification information comprises a warning message of a cell broadcast service.

5. A terminal apparatus, comprising:
a processor and a transceiver configured to:
receive a first geo-fencing trigger message, wherein the first geo-fencing trigger message comprises a notification information identifier;
in response to determining that the terminal apparatus stores notification information corresponding to the notification identifier, notify a user of notification content indicated by the notification information and delete the notification information stored;
receive a second geo-fencing trigger message, wherein the second geo-fencing trigger message comprises the notification information identifier; and
ignore the second geo-fencing trigger message in response to determining that the terminal apparatus does not store the notification information corresponding to the notification information identifier.

6. The apparatus according to claim 5, wherein in ignoring the second geo-fencing trigger message, the transceiver is configured to discard the second geo-fencing trigger message at a modem layer.

7. The apparatus according to claim 6, wherein an application layer is not woken up by the modem layer.

8. The apparatus according to claim 5, wherein in response to determining that the apparatus is located in an area indicated by area information included in the notification information, the processor is configured to notify the user of the notification content indicated by the notification information.

9. The apparatus according to claim 8, wherein the terminal apparatus is further configured to:
receive the notification information, wherein the notification information comprises the area information;
not notify the user of the notification content indicated by the notification information, in response to determining that the terminal apparatus is located outside the area indicated by the area information; and
store the notification information.

10. The apparatus according to claim 5, wherein the notification information comprises a warning message of a cell broadcast service.

11. A system, comprising:
a network side apparatus configured to send a trigger message; and
a terminal apparatus configured to:
receive a first geo-fencing trigger message, wherein the first geo-fencing trigger message comprises a notification information identifier;
in response to determining that the terminal apparatus stores notification information corresponding to the notification identifier notify a user of notification content indicated by the notification information and delete the notification information stored,
receive a second geo-fencing trigger message, wherein the second geo-fencing trigger message comprises the notification information identifier; and
ignore the second geo-fencing trigger message in response to determining that the terminal apparatus does not the store the notification information corresponding to the notification information identifier.

12. The system according to claim 11, wherein the notifying, based on at least the trigger message, a user of notification content indicated by the notification information further comprises:
notifying, the user of the notification content indicated by the notification information, in response to determining that the terminal apparatus is located in an area indicated by area information included in the notification information.

13. The system according to claim 12, wherein the terminal apparatus is further configured to:
receive the notification information, wherein the notification information comprises the area information;
not notify the user of the notification content indicated by the notification information, in response to determining that the terminal apparatus is located outside the area indicated by the area information; and
store the notification information.

14. The system according to claim 11, wherein the notification information comprises a warning message of a cell broadcast service.

\* \* \* \* \*